April 25, 1939.                R. E. SCOTT                2,155,873
                           VALVE FOR BRAKE SYSTEMS
                            Filed Feb. 11, 1937           2 Sheets-Sheet 1
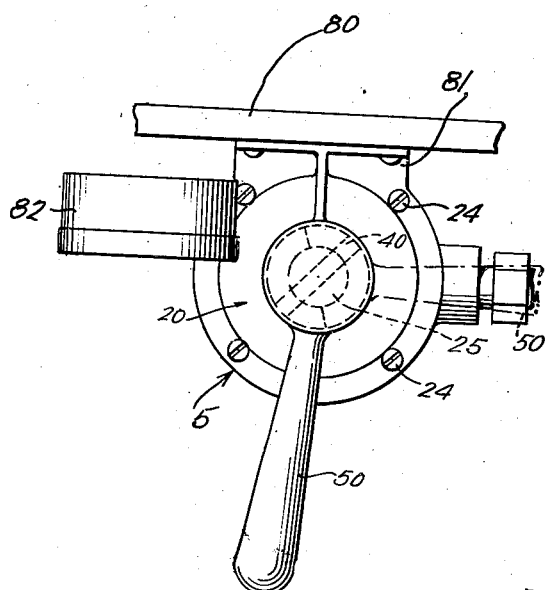
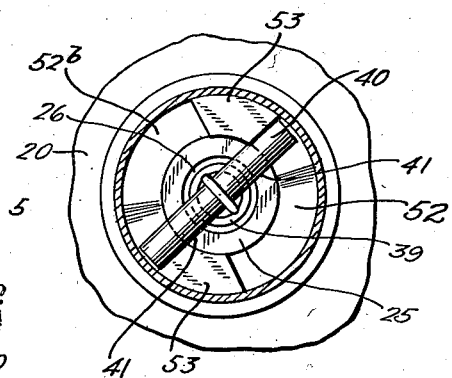
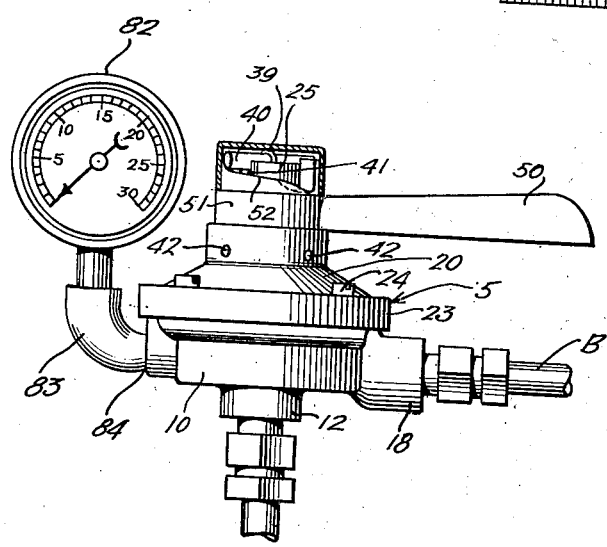
INVENTOR
ROBERT E. SCOTT
BY
Braselton Whitcomb & Davies
ATTORNEYS April 25, 1939.　　　　R. E. SCOTT　　　　2,155,873
VALVE FOR BRAKE SYSTEMS
Filed Feb. 11, 1937　　　2 Sheets-Sheet 2
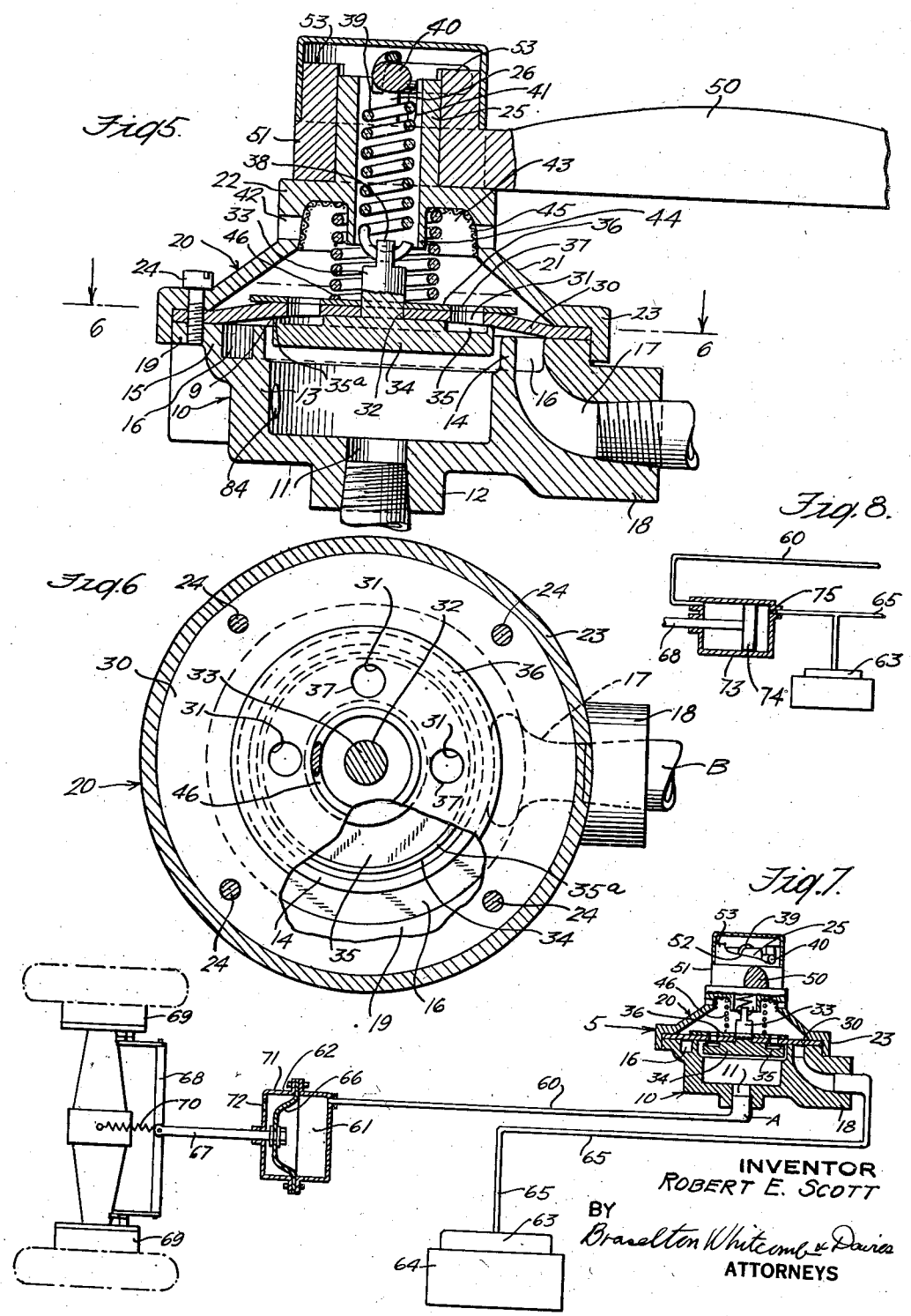
INVENTOR
ROBERT E. SCOTT
BY
Braselton Whitcomb & Davies
ATTORNEYS Patented Apr. 25, 1939

2,155,873

UNITED STATES PATENT OFFICE 2,155,873

VALVE FOR BRAKE SYSTEMS

Robert E. Scott, New York, N. Y., assignor to Henry F. Boeger, West Los Angeles, Calif.

Application February 11, 1937, Serial No. 125,173

12 Claims. (Cl. 303—54)

This invention relates to valves for use on power braking systems of the fluid pressure control type, and has particular applicability to use on large size motor vehicles such as trucks, buses and trailers, although readily usable on ordinary passenger motor vehicles.

Among the objects of the present invention is to provide a valve of the type mentioned which affords effective control for the braking system when applied either to a single vehicle or unit, or multiple vehicles or units, such for example as a truck with attached trailers. Another object of the invention is to provide a power valve control in which the variation of power applied is smooth and gradual, thus eliminating jumpy braking action. Still another object of the invention is to provide a control valve for power braking systems which is sensitive to movement of the control handle and positive in its controlling action.

Additional objects pertain to a type of valve control which is of simple construction, relatively inexpensive in its cost, which may be applied to ordinary vacuum power braking systems without reorganization, which is equally effective in remote control on trailers as on the primary vehicular unit, and other objects which will appear on consideration of the following description and the accompanying drawings.

Referring to the drawings, wherein is shown for purposes of illustration a modification of the invention which may be preferred, Fig. 1 is a top view of the valve showing the handle in "on" position;

Fig. 2 is a view partly in section showing an elevation of the valve connected in the vacuum pipe line;

Fig. 3 is an enlarged detail showing the top portion of the valve with the cap removed;

Fig. 4 is a development of one of the cams employed to secure a graduated movement of the valve;

Fig. 5 is a vertical section through the valve in "on" position;

Fig. 6 is a plan sectional view along the lines 6—6 of Fig. 5 showing the valve diaphragm;

Fig. 7 is a view showing a vertical section of the valve in "off" position and connected to the braking system of a vehicle; and Fig. 8 is a view of a modified brake drum.

Coincident with increase of the size of motor vehicles, particularly such as trucks and buses and the use of trailers in connection with trucks, it has become more and more necessary to employ power brakes so that positive control of the vehicles may be assured at all times. These requirements have been emphasized not only by the size and weight of the vehicles, but by action of States and insurance underwriters necessitating the employment of safe and effective braking apparatus.

Vacuum brake systems have been developed to meet these requirements, the braking action being secured by the effect of a vacuum in cylinders having a brake connected piston. A defect of this type of vacuum braking, however, has been due to the fact that the valve through which the vacuum is applied tends to operate jerkily and with wide extremes, that is, either with minimum or maximum power application. This makes it difficult for the driver of the vehicle to properly control the braking action.

In the control valve 5 described in the present invention there is employed a cup-shaped metal base member 10 having a base opening 11 formed in the threaded and integral coupling member 12. The upstanding flange 13 forming the edge wall of the member 10 terminates in a double rim 14 and 15, these rims being separated by a rectangular annular groove 16 to which an outlet connection is made by means of the channel 17 terminating in the threaded bushing 18. The rim 14, which forms a stationary and outer valve seat, has a larger diameter than the main cup portion of the casing 10, to afford clearance for the movement of the diaphragm unit, as will hereinafter be more fully described. The outer rim 15 is extended radially to form a flange 19.

Adapted for cooperating engagement with the base member 10 is the top member 20. This top member consists of a conical casing 21 terminating at its upper end in a circular collar 22 and an upstanding tubular member 25 enclosing a central aperture 26. The base of the conical member 21 terminates in a lower annular flange 23 depending over the flange 19 of base member 10 and secured thereto by means of screws 24.

Intermediate the upper and lower casing members 10 and 20, and secured between the peripheral flanges of said members, is the diaphragm 30 which is circular in formation and composed of alternate layers of fabric and rubber to provide strength, flexibility and imperviousness to the passage of fluids. Four circular openings 31 are formed in this diaphragm, equally displaced about the axis of the same. Centrally of the diaphragm a fifth opening 32 is made through which is adapted to extend the circular lug 33, the base of which, on the lower side of the diaphragm, being integral with a circular and flattened metal head 34 having a diameter somewhat less than that of the cup diameter of base element 10 between the rim 14. A peripheral groove 35 having a lip 35a forming valve seat 9 constituting the movable inner valve is formed on the upper surface of the head 34 underlying each of the four openings 31.

Overlying the diaphragm and clamping the same in its central portion to the head 34 is a metal plate 36 having apertures 37 coinciding in position and diameter to the apertures 31 of the diaphragm. This plate 36 is attached to the lug 33 so as to prevent rotational movement with respect to the diaphragm.

The upper end of the lug 33 terminates in an eyepiece 38 which is adapted to receive an end of the coil spring 39, the upper end of which is attached to a steel pin 40 extending transversely across the end of tubular casing element 25 and resting in vertical recesses 41 formed in the top edge thereof. The recesses 41 are of sufficient depth to permit a limited axial movement of the pin 40 without permitting it to escape over the edges of the recesses. The spring 39 is normally under tension so that the metal head 34 tends to force upwardly the diaphragm 30.

The collar 22 of the upper casing 20 of the valve is provided with lateral openings 42, there being four in the modification shown. These openings terminate interiorly in an enlarged annular recess 43 formed in the collar 22 and bounded by an inner extension 44 of the tubular member 25. A nickel screen 45 lines the upper and outer surface of the recess 43, the same covering the inner openings of apertures 42. This screen is normally held in position by a second coil spring 46 which has a larger diameter than coil spring 39, and hence having a lesser resistance to axial tension inasmuch as the diameter of the wire of the two coils is approximately the same. The upper end of the coil spring 46 seats against the screen 45 and the lower end rests on the plate 36, thus tending normally to urge the diaphragm 30 downwardly.

As a manual means for operating the valve I utilize a handle unit comprising a handle 50 attached to and integral with a hard metal collar 51 which on its upper surface is extended to form dual wedge surfaces 52. As shown in Fig. 3 and developed in Fig. 4 of the drawings, each of these wedge surfaces consists of an inclined plane surface curved to conform with the collar curvature and having two pitches or degrees of inclination numbered respectively 52a and 52b. These two wedge surfaces are separated by the curvilinear metal sections 53, as shown in Fig. 3 of the drawings. It is apparent from consideration of Fig. 3 that the pin 40 extends beyond the recesses 41 on both sides of the tube 25, and at either end the pin rests on one of the wedge surfaces 52, thereby holding the collar 51 in assembled position relative to the upper surface of collar 22.

The valve 5 is adapted for insertion in a vacuum brake system containing either the piston or diaphragm brake cylinders. In Fig. 7 I have illustrated the valve as applied to the latter type, the system including the pipe 60 connecting the valve port 11 to the vacuum chamber 61 of brake cylinder 62. The intake manifold 63 of the internal combustion engine 64 is connected by pipe 65 to the valve port 18. The brake cylinder 62 encloses the flexible diaphragm 66 adapted to function as a piston and formed of multi-ply rubber and fabric. To the center of the diaphragm by appropriate means is attached the piston rod 67. The brake beam 68 is pivoted to the rod 67 and at its end carries the connections to brake drum 69. The spring 70 normally urges the brake rod 67 to "off" position.

The valve unit is adapted to be secured to the instrument board 80, or any other point convenient to the operator. A bracket 81 is formed integral with the top casing 20 to facilitate such adjustment. There is also included in the unit a vacuum gauge 82 which has connection through the coupling 83 to an opening 84 formed in the lower base casing 10.

The chamber 71 of power cylinder 62 is maintained at atmospheric pressure through ports 72.

The operation of the valve in the diaphragm brake drum system will now be described. With the valve in the "off" position, as shown in Fig. 7, the vacuum of the manifold 63 is cut off by the closure of the diaphragm 30 on the outer valve seat 14. In this "off" position, also, the spring 70 holds the power drum diaphragm 66 at its off position; and the pipe 60 is vented to the atmosphere through the inner valve 35a and ports 31 and 42.

When the handle 50 is initially rotated the pin 40 rides over the steeper cam surface 52a, causing a quick opening of outer valve 14 and quick closing of inner valve 35a. Vacuous pressure is thereby impressed on the vacuum chamber 61 of power cylinder 62 through pipe 60, thereby causing a movement of diaphragm 66 in a direction against the pull of spring 70 and thus energizing the brakes. The steeper cam section 52a insures a rapid pressure reduction in the initial stage to insure immediate brake application, followed by a slower reduction as the pin rides over cam section 52b.

In releasing the brakes the reverse movement of the handle brings about a gradual closure of the vacuum line at outer valve seat 14 followed by a more rapid opening of inner valve 35a, thus restoring air pressure to power cylinder chamber 61 and bringing the diaphragm 66 into its off position. The spring 70 aids in restoring the diaphragm 66 to its "off" position.

The control valve unit is equally applicable to the piston type brake system, such as is illustrated in Fig. 8. When applying the valve to this system the pipe 60 is connected to the brake cylinder chamber 73 on the brake side of the piston 74 and the pipe 65 is connected not only to the intake manifold 63 but also to the power cylinder chamber 75 formed by the piston 74 and the cylinder wall opposite the brake rod.

In the operation of this type of brake system the valve "off" and "on" positions are reversed from that of the preferred use above described. In this arrangement when the valve is in the position of Fig. 7 the power cylinder chamber 75 is at a reduced pressure, whereas chamber 73 is open through the valve to the atmosphere. This moves the piston 74 to braking position against spring 70. Also, when the valve is in the position of Fig. 5 the air ports in the diaphragm 30 are closed and both chambers 73 and 75 are evacuated. The piston consequently "floats" and moves to "off" position because of the spring 70.

It is a feature of the present invention that the vacuum differential on the brake piston is applied gradually so that the braking action is through small intermediate and graduated steps instead of through large changes. This is accomplished by virtue of the gradual reversal of closure and opening of the valve openings at casing rim 14 and diaphragm head valve seat 9. In changing from one position to the other the space between the rim 14 and the diaphragm is gradually lessened until it is completely closed, and this closure is then followed by the gradual separation of the head valve seat 9 from the diaphragm to the position of Fig. 7. This movement of the valves is controlled by the two-slope cam and the coil spring 39. The primary purpose of the initial high pitch surface is to hasten the initial power application. Approximately twenty percent of the braking power is effective at the end of the initial cam movement.

The coil spring 39 appears to be vital to the successful operation of the valve. My researches have demonstrated that a rigid link between the eyepiece 38 and pin 40 seriously diminishes the effectiveness of the valve. The spring supplies a yield, permitting a slight lag in the to-and-fro movement and allowing a small rotational movement, and because of this yield the diaphragm functions correctly. There is thus a dual movement in sequence of the diaphragm with reference to a fixed and a moving member which effectively controls the variation in the applied vacuum from zero to maximum and thus accomplishes the object of the invention.

While I have described the cam surfaces 52 as formed with two inclinations 52a and 52b, it is within the scope of my invention to use either one or three or more inclinations for specific valve adaptations. Various other modifications may also be made coming within the scope of the invention as defined by the claims hereto appended.

Having thus described my invention, I claim:

1. A valve for fluid pressure braking systems comprising a casing having upper and lower interconnected members, a flexible diaphragm interposed and held between the adjacent edges of said casing members, a handle having an attaching collar mounted on the upper casing member, an inclined surface formed on the edge of said collar, a pin adapted to travel over said inclined surface, means for preventing rotation of said pin, a yielding connection between said pin and diaphragm, a circular head attached to the side of the diaphragm opposite from the spring, said head having an annular groove on the head surface adjacent the diaphragm, the lower casing member enclosing said head being provided with an annular groove adjacent the diaphragm with pipe connections to said groove and to said casing member external to the groove, the diaphragm normally closing the passage between the casing groove and casing interior and opening the passage between the head groove and casing interior at one limit of its flexure, and closing the passage between the head groove and casing interior and opening the passage between the casing groove and casing interior at the other limit of its movement.

2. A valve for fluid pressure braking systems comprising a lower casing member having a grooved edge, an upper casing member having an axial tubular extension, a diaphragm interposed between said members and retained thereby, a handle having a collar adapted to seat over said casing tubular extension, said collar being provided with cam surfaces, a pin movable axially in slots formed in said extension and having ends resting on said cam surfaces, a spring connection between the pin through said tubular extension to the diaphragm, a flat head having an upper annular groove secured to the center of said diaphragm and movable therewith, said groove being adapted to be opened and closed by the movement of the diaphragm, openings through the diaphragm above said head groove, openings through the upper casing wall forming connections to the atmosphere, and pipe connections to the lower casing groove and lower casing interior.

3. A valve for fluid pressure braking systems comprising a lower casing member having a grooved edge, an upper casing member having an axial tubular extension, a diaphragm interposed between said members and retained thereby, a handle having a collar adapted to seat over said casing tubular extension, said collar being provided with similar cam surfaces, each of said surfaces having plural pitch inclinations, a pin movable axially in slots formed in said extension and having ends resting on said cam surfaces, a spring connection between the pin through said tubular extension to the diaphragm, a flat head having an upper annular groove secured to the center of said diaphragm and movable therewith, said groove being adapted to be opened and closed by the movement of the diaphragm, openings through the diaphragm above said head groove, openings through the upper casing wall forming connections to the atmosphere, and pipe connections to the lower casing groove and lower casing interior.

4. A control for fluid pressure braking systems comprising a casing, a valve seat within the casing, a flexible disc adapted to engage said seat, a second valve seat attached to and movable with said flexible disc, said disc engaging said second valve seat to permit opening and closing thereof, the second valve seat being normally open when the first valve seat is closed, said disc being provided with openings to the atmosphere enclosed by said second valve seat, an actuator, a yieldable tension connection between the actuator and diaphragm, and a cam element interposed between the yieldable connection and actuator for alternatively opening and closing said valve seats when the actuator is moved.

5. A control for fluid pressure braking systems consisting of a casing, a diaphragm dividing said casing into upper and lower chambers and provided with apertures therethrough, a head in the lower chamber casing having a groove therein forming an inner valve seat adjacent to, and attached to the center of, said diaphragm, said groove registering with the diaphragm apertures, a groove in the lower chamber casing positioned adjacent the head groove but outwardly therefrom and forming an outer valve seat, ports communicating with the lower chamber groove, the lower chamber and the upper chamber, and yielding means for actuating said diaphragm, said means including a cam element.

6. A control for fluid pressure braking systems consisting of a casing, a diaphragm dividing said casing into upper and lower chambers and provided with apertures therethrough, a head in the lower chamber casing having a groove therein forming an inner valve seat adjacent to, and attached to the center of, said diaphragm, said groove registering with the diaphragm apertures, a groove in the lower chamber casing positioned adjacent the head groove but outwardly therefrom and forming an outer valve seat, ports communicating with the lower chamber groove, the lower chamber and the upper chamber, and yielding means for actuating said diaphragm, said means including a cam element having plural camming surfaces, a pin movable on the camming surfaces, guide members to prevent bodily rotation of the pin, a manual actuating element for the cam element, a tension spring connecting the pin with the diaphragm, and a compression spring between the diaphragm and the upper casing chamber.

7. A valve unit comprising a diaphragm, a stationary valve seat, a movable valve seat attached centrally to said diaphragm and displaced inwardly from said stationary valve seat, an actuator provided with a cam surface, a pin movable over said cam surface to and from the diaphragm only, a yielding tension connection between the diaphragm and pin, and a casing providing apertured chambers on both sides of the diaphragm, said diaphragm by its movement being adapted for simultaneous contact with both of said valve seats.

8. A valve mechanism comprising two coaxial valve seats one of which is stationary, a flexible valve fabric supporting the non-stationary valve seat, and means for imposing a yielding flexure of the valve fabric whereby the valve seats are alternately closed and opened in sequence, said means including a bearing pin, a tension spring member interposed between, and fixedly attached to, the bearing pin and the valve fabric, and camming means for moving said bearing pin to and from the valve fabric.

9. A valve mechanism comprising two coaxial valve seats one of which is stationary, a flexible valve fabric supporting the non-stationary valve seat, and means for imposing a yielding flexure of the valve fabric whereby the valve seats are alternately closed and opened in sequence, said means including a bearing pin, a spring member interposed between and connected to the bearing pin and the valve fabric, and camming means for moving said bearing pin to and from the valve fabric, said camming means including a caming surface having plural inclinations.

10. A control for fluid pressure braking systems comprising a casing, a diaphragm dividing said casing into upper and lower chambers and provided with apertures therethrough, a head in the lower chamber casing having a groove therein forming an inner valve seat adjacent to, and attached to the center of, said diaphragm, said groove registering with the diaphragm apertures, a groove in the lower chamber casing positioned adjacent the head groove but outwardly therefrom and forming an outer valve seat, ports communicating with the lower chamber groove, the lower chamber and the upper chamber, yielding means for actuating said diaphragm, said means including a cam element having two camming surfaces of differing inclination with reference to the plane of the diaphragm, the surface of greater inclination forming less than one-half of the total camming surface.

11. A control for fluid pressure braking systems comprising a casing, a diaphragm dividing said casing into upper and lower chambers and provided with apertures therethrough, a head in the lower chamber casing having a groove therein forming an inner valve seat adjacent to, and attached to the center of, said diaphragm, said groove registering with the diaphragm apertures, a groove in the lower chamber casing positioned adjacent the head groove but outwardly therefrom and forming an outer valve seat, ports communicating with the lower chamber groove, the lower chamber and the upper chamber, and yielding means for actuating said diaphragm, said means including a cam element having plural camming surfaces, a pin movable on the camming surfaces, guide members to prevent bodily rotation of the pin, a manual actuating element for the cam element, a compression spring normally urging said diaphragm in a direction to close said outer valve seat, and a screen retained by said compression spring adjacent the upper chamber ports.

12. A valve mechanism comprising two annular valve seats concentrically positioned, the inner seat being movable and the outer stationary, a diaphragm supporting the movable valve seat, a lower casing enclosing said valve seats provided with pipe line ports to each of said valve seats, and means for imposing a yielding flexure of the diaphragm comprising an upper casing having a slotted tubular extension, a pin movable in said slots to and from the diaphragm, a coil spring connecting the pin through the tubular extension with the diaphragm, a coil spring of larger diameter within said first mentioned spring normally urging the diaphragm to a position closing the outer valve seat, a cam for shifting said pin in said grooves, and an actuator for said sam, atmosphere ports being provided in the diaphragm above the inner valve seat and in the upper casing.

ROBERT E. SCOTT.